US008478232B2

(12) United States Patent
Vasten

(10) Patent No.: US 8,478,232 B2
(45) Date of Patent: Jul. 2, 2013

(54) PREPAID TEXT MESSAGING SERVICE

(75) Inventor: Brett Vasten, Highlands, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 679 days.

(21) Appl. No.: 12/142,548

(22) Filed: Jun. 19, 2008

(65) Prior Publication Data

US 2009/0318112 A1    Dec. 24, 2009

(51) Int. Cl.
*H04W 4/24* (2009.01)

(52) U.S. Cl.
USPC ........................... 455/406; 455/412.1; 705/37

(58) Field of Classification Search
USPC ................ 455/405–409, 412.1, 412.2, 414.1, 455/414.6, 566; 705/14.69, 20, 26, 37, 67, 705/75

See application file for complete search history.

(56) References Cited

U.S. PATENT DOCUMENTS

| | | | |
|---|---|---|---|
| 5,530,438 A | 6/1996 | Bickham et al. | |
| 5,935,243 A * | 8/1999 | Hasebe et al. | 726/26 |
| 8,145,566 B1 * | 3/2012 | Ahuja et al. | 705/39 |
| 2002/0169854 A1 * | 11/2002 | Tarnoff | 709/219 |
| 2004/0203713 A1 * | 10/2004 | Strunk | 455/422.1 |
| 2006/0080263 A1 | 4/2006 | Willis et al. | |
| 2006/0122894 A1 * | 6/2006 | McGary et al. | 705/26 |
| 2006/0248148 A1 * | 11/2006 | Timmins et al. | 709/206 |
| 2007/0105536 A1 * | 5/2007 | Tingo, Jr. | 455/414.1 |
| 2007/0174448 A1 * | 7/2007 | Ahuja et al. | 709/224 |
| 2007/0244830 A1 * | 10/2007 | Hilderman | 705/67 |
| 2008/0167000 A1 * | 7/2008 | Wentker et al. | 455/408 |
| 2009/0075627 A1 * | 3/2009 | Hwang et al. | 455/408 |
| 2009/0311989 A1 * | 12/2009 | Duan et al. | 455/406 |
| 2010/0069093 A1 * | 3/2010 | Morrison | 455/456.3 |
| 2011/0307366 A1 * | 12/2011 | Ahuja et al. | 705/37 |

FOREIGN PATENT DOCUMENTS

| | | |
|---|---|---|
| EP | 1067492 A2 | 10/2001 |
| KR | 10-2004-0039508 A | 5/2004 |
| KR | 10-2004-0100647 A | 12/2004 |

OTHER PUBLICATIONS

Search/Examination Report dated Jan. 21, 2010 from International Application No. PCT/US2009/047637, 11 pages.

* cited by examiner

*Primary Examiner* — Kamran Afshar
*Assistant Examiner* — Khawar Iqbal
(74) *Attorney, Agent, or Firm* — Kilpatrickt Townsend & Stockton LLP

(57) ABSTRACT

A method, system, and computer readable medium for sending notification messages to a notification device and associating a fee for sending the notification message. The notification message is associated with a portable consumer device issued by an issuer and associated with an account of a consumer operated by the issuer. The fee is obtained by the issuer or a payment brand organization associated with the portable consumer device.

27 Claims, 12 Drawing Sheets

FIG. 6

| TEEN PROFILE | |
|---|---|
| Name: | Mr. Chris Doe |
| Address: | 1010 College LN<br>Parker CO, 80111 |
| Phone: | Home 303-555-6666 |
| Date of Birth: | 08-11-83 |
| Social Security #: | XXX-XX-9876 |
| Username: | chrisdoe123 |
| Password: | ••••••• |
| Email Address | chrisdoe@domain.com |
| Security Question: | What is the city of my birth? |
| Answer: | Topika |

| SHIPPING METHOD | |
|---|---|
| Standard Delivery by US Mail – Shipping to Parent | |
| Address: | 1010 College LN<br>Parker CO, 80111 |

| INITIAL VALUE | |
|---|---|
| Initial Amount: $400 | |
| Send an enrollment notice to my teen: | Yes |

| CASH ACCESS | |
|---|---|
| Allow Cash Access: | Yes |
| Weekly Limit: | $100 |

| NOTIFICATION & ALERT OPTIONS | | |
|---|---|---|
| Email Notifications | | |
| Send me a daily Email with all of my teen's transactions for that day: | | Yes |
| Send me an Email alert when my teen makes adult-oriented purchases: | | Yes |
| Send me an Email alert when my teen's balance is low: | | Yes, below $<xx.xx> |
| Text Message Information | | |
| My Text Message Device Number: | 303-123-4567 | |
| My Teen's Text Message Device Number: | 303-123-4567 | |
| Allow teen to manage Text Message settings: | Yes | |

Text Message Options

| Parent | Teen | Text Message | Criteria |
|---|---|---|---|
| No | No | Daily Available Balance | |
| No | No | Approved Pending Transactions | |
| Yes | Yes | Declined Transactions | |
| Yes | No | Value Load | |
| Yes | No | Change of Card Status | |
| Yes | Yes | Low Balance | Set Low Balance: $100 |
| Yes | No | Funds Transfer Requested | |
| Yes | | Adult-Oriented Purchase | |
| Yes | No | Cardholder Profile Data Updated | |

| SCHEDULED FUNDING | |
|---|---|
| Amount: | $100 |
| Frequency: | Weekly starting on 06-15-2005 |

| ADD FUNDS WHEN MY TEEN'S BALANCE IS LOW | |
|---|---|
| Low Balance: | Below $25 |
| Amount To Add: | $250 from XXXX-XXXX-XXXX-3838 |

| | 610 | |
|---|---|---|
| Overview | Account Holder Information | |
| Account Information | Account Holder: Jane Wallace | RETURN TO ACCOUNT HOLDER |
| Account History | Cardholder Information 620 | |
| Fee Schedule | Cardolder: Bobby Wallace | |
| Funding Information | Text Message Information 630 | |
| Funding History | Please ensure they enter a phone number of the text-capable device: | |
| Statements | Account Holder Text Message Device Number: 303-555-1234 — 632 | |
| Text Messages | Confirm Account Holder Text Message Device Number: 303-555-1234 | |
| Notes | Cardholder Text Message Device Number: 303-555-4321 — 634 | |
| Authorization | Cardholder Text Message Device Number: 303-555-4321 | |
| Posted | Allow teen to modify Text Message settings: ◉ No  ○ Yes (Additional Fees May be Incurred.) — 636 | |
| Pending | Text Message Options 640 | |
| Denied | The following options allow the account holder and cardholder to receive updates on this cardholder's card activity. | |
| Authorizations | NOTE: If the account holder or cardholder signs up for any text message alerts, they will be charged a monthly fee of $<x.xx> and a fee of $<x.xx> for each message they are sent. This is in addition to any fees charged by their service provider. | |

| Parent | Teen | Text Message | Criteria |
|---|---|---|---|
| ☐ | ☐ | Daily Available Balance | |
| ☐ | ☐ | Approved Pending Transactions | |
| ☐ | ☐ | Declined Transactions | |
| ☐ | ☐ | Value Load | |
| ☐ | ☐ | Change of Card Status | |
| ☐ | ☐ | Low Balance | Set Low Balance: $ |
| ☐ | ☐ | Funds Transfer Requested | |
| ☐ | | Adult-Oriented Purchase | |
| ☐ | ☐ | Cardholder Profile Data Updated | |

Load Funds
Unload Funds
Reset Password
Suspend Card
Close Card
Replace Lost/Stolen Card
Reverse Fee
Miscellaneous Adjustment
Emergency Card Replacement
Returned Mail 650   660

| ► Account Activity |
|---|
| ▼ Profile |
| • Update Profile |
| • Create PIN |
| • Change PIN |
| • Forgot PIN |
| • Change Password |
| • Suspend Card |
| • Reactivate Card |
| • Close Account |
| • Manage Transfer-To Accounts |
| • Text Messages |
| ► Joint Accounts |
| ► Sign Out |

<System Message>

Text Messages

The following options allow you to receive updates on your card activity.

Text Message Information — 810

NOTE: If you sign up for any text message alerts, you will be charged a monthly fee of $<x.xx>. This is in addition to any fees charged by your service provider. Please ensure you enter the phone number of a text-capable device.

NOTE: You will be charged a fee of $<x.xx> for each message you are sent. This is in addition to any fees charged by your service provider. Please ensure you enter a phone number of the text-capable device.

NOTE: If you sign up for any text message alerts, you will be charged a monthly fee of $ and a fee of $<x.xx> for each message you are sent. This is in addition to any fees charged by your service provider. Please ensure you enter a phone number of the text-capable device.

NOTE: Fees may be charged by your service provider. Please ensure you enter a phone number of a text-capable device.

— 812

My Text Message Device Number: [          ] Example: 303-123-4567
Confirm My Text Message Device Number: [          ] Example: 303-123-4567

— 818

820 — Text Message Options

| Select | Text Message | Criteria |
|---|---|---|
| ☐ | Daily Available Balance | |
| ☐ | Approved Pending Transactions | |
| ☐ | Declined Transactions | |
| ☐ | Value Load | |
| ☐ | Change of Card Status | |
| ☐ | Low Balance | Set Low Balance: $ [     ] |
| ☐ | Funds Transfer Requested | |
| ☐ | Cardholder Profile Data Updated | |

Text Messages Sent

| Report Data | |
|---|---|
| Client: | PRC388 - Bellco Credit Union |
| Card Program: | Bellco Credit Union Visa Gift Card |
| Location: | All |
| Run Date: | 08-07-2007 16:48:00 |
| Page: | 1 of 1 |

924

| | |
|---|---|
| Total Account Holders with Text Messages Enabled | 10365 |
| Total Card Holders with Text Messages Enabled | 96334 |

926

| Message Type | Sent Counts | Subscribed Accounts |
|---|---|---|
| Current Balance | 823 | 8563 |
| Approved Authorizations | 5614 | 465 |
| Declined Authorizations | 15 | 5466 |
| Value Load | 5545 | 54 |
| Change of Card Status | 556445 | 5256 |
| Balance Below Threshold | 221 | 5654 |
| Funds Transfer Request | 2854 | 5545 |
| Adult-oriented purchase | 254 | 44 |
| Cardholder profile updated | 3213 | 234 |
| Falcon Fraud Block | 254 | 54 |
| Total | 575238 | 31335 |

FIG. 12

PREPAID TEXT MESSAGING SERVICE

BACKGROUND

Some prior notification systems send notification messages (e.g., text messages) to consumers regarding their account, balances on a prepaid card, current transactions, or other relevant information. For example, an issuer (e.g., a bank) may notify a consumer when their credit card is being used to make a large purchase or when their balance is over their credit limit. An issuer might also notify the holder of a prepaid card of their remaining balance on that card.

In these prior systems, text messages are distributed by an aggregator (e.g., a phone company). The aggregator keeps a database of phone numbers for distributing the text messages to cell phones, and the issuer pays the aggregator for sending messages to consumers.

In some cases, the issuer may not have a way of passing the expenses of text messaging back to the consumer. For example, prepaid cards are not necessarily associated with an account operated by the issuer. As a consequence, the issuer may not have contact information for the consumer and cannot charge the consumer back for the text messages. In these cases, the issuer has limited incentive to use or improve the notification systems since they cannot recover expenses for sending the text messages.

Embodiments of the present disclosure address these and other problems, individually and collectively.

SUMMARY OF THE INVENTION

Embodiments of the invention relate to methods, systems, and computer readable medium for sending notification fees and associating fees with the notification messages.

Embodiments of the invention address the above-noted problems by providing a system that generates fees for notification messages. The fees can be sent to issuers (e.g., banks) so that issuers can charge their consumers for the notification messages.

An embodiment of the invention is directed to a method that sends a notification message to a notification device. The notification message is associated with a portable consumer device issued by an issuer and associated with an account of a consumer operated by the issuer. The method also associates a fee for sending the notification message. The fee can be obtained by the issuer or a payment brand organization associated with the portable consumer device. The issuer can charge the consumer fee for the notification message.

Another embodiment of the invention is directed to a system having a database for storing fees and a notification server coupled to the database. The notification server configured to send a notification message to a notification device. The notification message is associated with a portable consumer device issued by an issuer and associated with an account of a consumer operated by the issuer. The notification server is further configured to associate a fee for sending the notification message. The fee is to be obtained by the issuer or a payment brand organization associated with the portable consumer device. The notification server is further configured to send the fee to the issuer.

Another embodiment of the invention is directed to a computer readable medium having code for sending a notification message to a notification device,. The notification message is associated with a portable consumer device issued by an issuer and associated with an account of a consumer operated by the issuer. The computer readable medium also has code for associating a fee for sending the notification message. The fee is to be obtained by the issuer or a payment brand organization associated with the portable consumer device.

These and other embodiments of the invention are described in further detail below.

BRIEF DESCRIPTION OF THE DRAWINGS

FIG. 6 is a screenshot illustrating an interface that allows a parent to manage notification message options for a parent and a teen, in accordance with an embodiment of the invention.

FIG. 7 is a screenshot illustrating a summary of the notification message options elected by parent, in accordance with an embodiment of the invention.

FIG. 8 is a screenshot illustrating an interface that allows a user to manage notification message options, in accordance with an embodiment of the invention.

FIG. 9 is a screenshot illustrating an interface that allows a user to manage notification message options, in accordance with an embodiment of the invention.

FIG. 10 is a screenshot illustrating an interface that allows a consumer to manage their text message options, in accordance with an embodiment of the invention.

FIG. 12 is a screenshot of a report, in accordance with an embodiment of the invention.

DETAILED DESCRIPTION

Embodiments of the invention are directed to a method and system of providing notification messages (e.g., text messages) and associating fees to those notification messages. More specifically, a consumer enrolls to receive notification messages with the issuer (e.g., a bank) or with a payment brand organization (e.g., credit card company) associated with their portable consumer device (e.g., prepaid card). Notification messages are sent to the consumer on a notification device (e.g., a cell phone) when a triggering event occurs. A message fee is created each time a notification message is sent to the notification device. A periodic fee may also be initiated after the consumer enrolls to receive notification messages. These fees are associated with the consumer receiving the notification messages. The issuer and/or payment brand organization can forward the fees to the consumer based on the contact information entered during enrollment to receive the notification messages.

Certain embodiments of the invention may provide one or more technical advantages to issuers and consumers. In previous systems, only aggregators have been able to charge fees for sending notification messages. In this system, a technical advantage to issuers may be that issuers can charge fees to consumers for notification messages. Since issuers can capture part of this revenue stream, issuers will have incentive to develop and maintain notification methods and systems. As a result, these systems may improve and provide better service to consumers. Thus, a technical advantage to consumers may be improved consumer service. Furthermore, issuers may provide incentives to consumers to enroll to receive notification messages because the notification messages may represent a source of income to the issuer. Thus, another technical advantage to consumers may be that issuers provide incentives to enroll in notification messages programs.

Certain embodiments of the invention may include none, some, or all of the above technical advantages. One or more other technical advantages may be readily apparent to one skilled in the art from the figures, descriptions, and claims included herein.

1. Notification System 10

Figure 1:
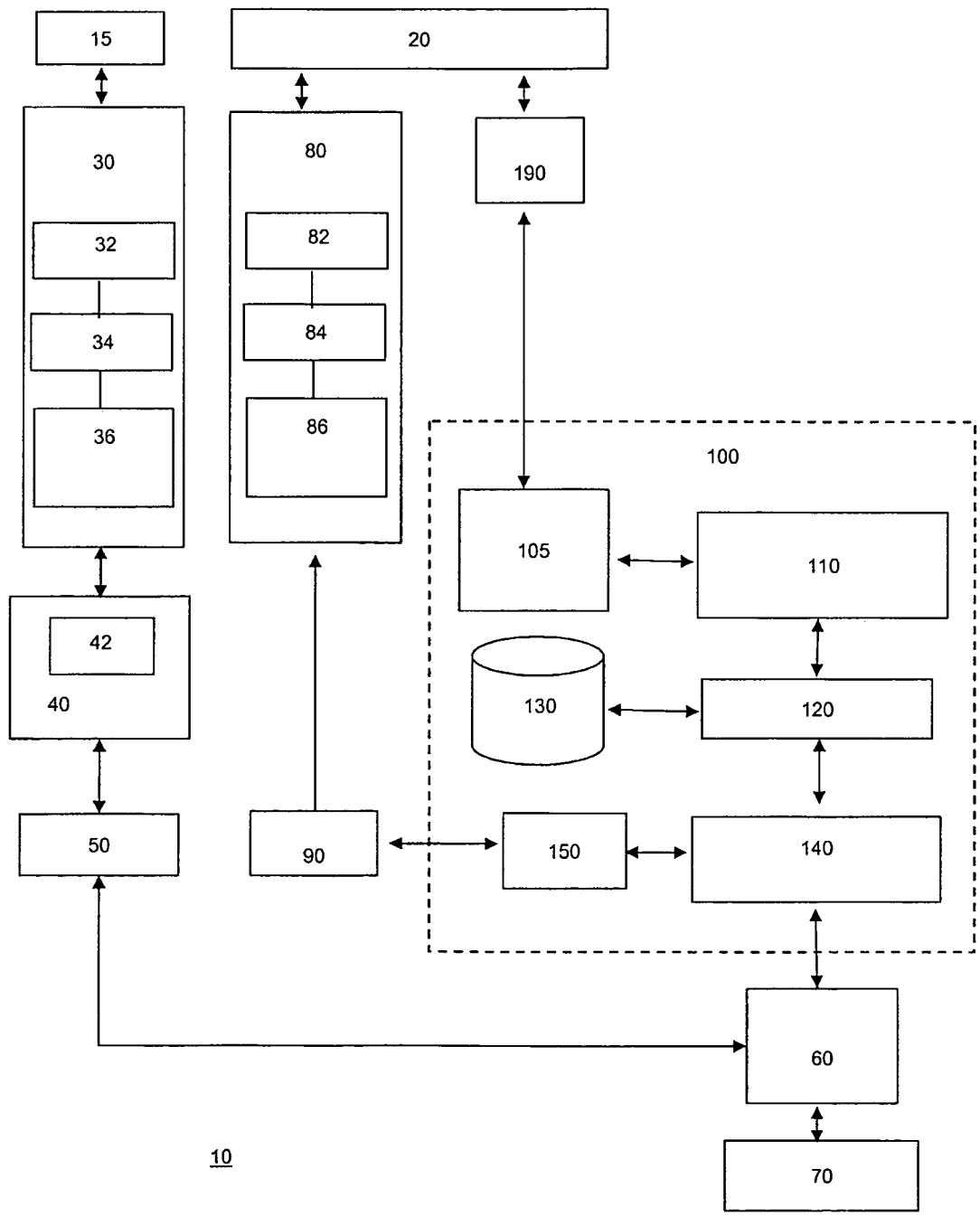
FIG. 1 is a block diagram illustrating a notification system, in accordance with an embodiment of the invention.

FIG. 1 is a block diagram illustrating a notification system 10, in accordance with an embodiment of the invention. Notification system 10 includes a holder 15, a consumer 20, a portable consumer device 30, a merchant 40 having an access device 42, an acquirer 50, a payment processing network 60, an issuer 70, a notification device 80, an aggregator 90, an enrollment and notification module 100, and a computer 190. Enrollment and notification module 100 includes a notification enrollment server 105, a notification enrollment application server 110, a database server 120, a notification and fee database 130, a notification server 140, and a gateway 150. Although one holder 15, one consumer 20, one portable device 30, one merchant 40, one acquirer 50, one issuer 70, one notification device 80, and one computer 190 are shown, there may be any suitable number of any of these entities in notification system 10. For example, notification system 10 may have two notification devices 80 where one is in communication with holder 15 and one is in communication with consumer 20.

In the illustrated embodiment of notification system 10, holder 15 is in operative communication with portable consumer device 30 for making transactions. Merchant 40 includes an access device 42 (e.g., a point of sale terminal) for interacting with portable consumer device 30 to conduct the transactions. Merchant 40 is also in communication with an acquirer 50 (e.g., a bank) associated with merchant 40. Acquirer 50 is in communication with issuer 70 through payment processing network 60. Issuer 70 operates an account of consumer 20 that is associated with portable consumer device 30. Although not shown, issuer 70 may also be in communication with consumer 20. Notification system 10 also includes a payment processing network 60 that is in communication with enrollment and notification module 100, acquirer 50, and issuer 70.

Notification system 10 also includes computer 190 in communication with consumer 20 and enrollment and notification module 100. Consumer 20 can use computer 190 to enroll to receive notification messages (e.g., text messages) on their notification device 80 (e.g., a cell phone). Consumer can also use computer 190 to receive and manage notification messages. Notification system 10 includes an aggregator 90 for collecting and forwarding notification messages from enrollment and notification module 100 to notification device 80. Consumer 20 is in operative communication with notification device 80 to request and manage notification messages received from enrollment and notification module 100.

Holder 15 of portable consumer device 30 refers to an individual or organization that uses portable consumer device 30 to conduct a transaction such as a purchase of goods or services.

Consumer 20 refers to an individual or organization that has an account associated with portable consumer device 30 where the account is operated by issuer 70. Consumer 20 receives notification messages associated with the account on notification device 80. In some cases, consumer 20 may also be the holder 15 of portable consumer device 30. In Portable consumer device 30 refers to any suitable device that allows holder 15 to conduct transactions with merchant 40. Portable consumer device 30 may be in any suitable form. For example, suitable portable consumer devices 30 can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices 30 include cellular phones, personal digital assistants (PDAs), pagers, payment cards, security cards, access cards, smart media, transponders, and the like. The portable consumer devices 30 can also be debit devices such as a debit card, credit devices such as a credit card, or stored value devices such as a prepaid card or other a stored value card. In some cases, portable consumer device 30 may be associated with an account of consumer 20 such as a bank account.

In the illustrated example, portable consumer device 30 includes a contactless transmitter 32 for sending wireless signals, a processor 34, and a computer readable medium (CRM) 36. These elements of portable consumer device 30 are in communication with each other. Processor 34 (e.g., a microprocessor) processes the functions of portable consumer device 30. In other examples, portable consumer device 30 may include a contactless receiver for receiving wireless signals.

Contactless transmitter 32 refers to any suitable device for sending wireless signals with information stored in memory (e.g., CRM 36) on portable consumer device 30 to another device with a contactless receiver such as notification device 80. Contactless transmitter 32 transmits signals using a near field communications (NFC) capability to send information from portable consumer device 30 to the contactless receiver 82 on notification device 82. Typically, NFC capability is in accordance with a standardized protocol or data transfer mechanism (e.g., ISO 14443/NFC). Some examples of NFC capability are radio-frequency identification (RFID), Bluetooth™, infra-red, and other suitable communications capability. In other embodiments, contactless transmitter 32 transmits information via a cellular network by means of an interface (not shown). The interface functions to permit exchange of data between the cellular network (not shown) and contactless transmitter 32.

CRM 36 refers to memory that stores data and allows the stored data to be retrieved. CRM 36 may be in any suitable form. Exemplary CRM 36 may be in any suitable form including a magnetic stripe, a memory chip, etc. If portable consumer device 30 is in the form of a card, it may have an embossed region (ER) which is embossed with a PAN (primary account number). CRM 36 may electronically store the PAN as well as other data such as PIN data. CRM 36 may be on the body of portable consumer device 30. The body may in the form of a plastic substrate, a housing, or other structure.

Merchant 40 refers to any suitable entity or entities that conducts transactions with holder 15 of portable consumer device 30. Some examples of merchants 40 include a department store, a gas station, a drug store, a grocery store, or other suitable business. Merchant 40 may use any suitable method to make the transaction. For example, merchant 40 may use an e-commerce business to allow the transaction to be conducted by merchant 40 through the Internet.

Access device 42 may be any suitable device for communicating with merchant 40 and for interacting with portable consumer device 30. Access device 42 can be in any suitable location such as at the same location as merchant 40. Access device 42 may be in any suitable form. Some examples of access devices 42 include POS devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. Access device 42 may use any suitable contact or contactless mode of operation to send to or receive data from portable consumer devices 30.

If access device 42 is a POS terminal, any suitable POS terminal may be used and may include a reader, a processor, and a computer readable medium. The reader may use include any suitable device for contact or contactless modes of operation. For example, exemplary card readers can include radio frequency (RF) antennas, optical scanners, bar code reader, magnetic stripe readers, or other suitable devices for interacting with portable consumer device 30.

Acquirer 50 refers to any suitable entity that has an account with merchant 40. For example, acquirer 50 may be a bank that operates a bank account for merchant 40.

Issuer 70 refers to any suitable entity that may open and maintain an account associated with portable consumer device 30 for consumer 20. Some examples of issuers may be a bank, a business entity such as a retail store, or a governmental entity. In many cases, issuer 70 may also issue portable consumer device 30 to consumer 20 or holder 15. In some embodiments, issuer 70 may also be the acquirer 50.

Payment processing network 60 may include data processing subsystems, networks, and operations used to support and deliver authorization services, exception file services, and clearing and settlement services. An exemplary payment processing network 60 may include VisaNet™. Networks that include VisaNet™ are able to process credit card transactions, debit card transactions, prepaid card transactions, and other types of commercial transactions. VisaNet™, in particular, includes a VIP system (Visa Integrated Payments system) which processes authorization requests and a Base II system which performs clearing and settlement services. Payment processing network 60 may use any suitable wired or wireless network, including the Internet.

Although not shown in the illustrated embodiment, payment processing network 60 may have or operate a server computer. A "server computer" or "server" is typically a powerful computer or cluster of computers. For example, the server computer can be a large mainframe, a minicomputer cluster, or a group of servers functioning as a unit. The server computer may be coupled to one or more databases and may include any hardware, software, other logic, or combination of the preceding for servicing the requests of one or more client computers. The server computer may use any of a variety of computing structures, arrangements, and compilations for servicing the requests from one or more client computers.

Payment processing network 60 may also include one or more databases. A database refers to any hardware, software, firmware, or combination of the preceding for storing and facilitating retrieval of information. A database may use any of a variety of data structures, arrangements, and compilations to store and facilitate retrieval of information.

Notification device 80 refers to any suitable device for receiving notification messages. Notification device 80 may also allow notification messages to be managed. In the illustrated embodiment, notification device 80 provides notification messages to consumer 20. In other embodiments, there may be a notification device 80 providing notification messages to holder 15.

Notification device 80 may be in any suitable form. For example, suitable notification devices 80 can be hand-held and compact so that they can fit into a consumer's wallet and/or pocket (e.g., pocket-sized). Some examples of notification device 80 include desktop or laptop computers, cellular phones, personal digital assistants (PDAs), pagers, payment cards, security cards, access cards, smart media, transponders, and the like. In some embodiments, notification device 80 and portable consumer device 30 are embodied in the same device.

In the illustrated embodiment, notification device 80 includes a contactless receiver 82 for receiving wireless signals, a processor 84 coupled to the receiver 82, and a computer readable medium (CRM) 36 coupled to processor 84. Although not shown, notification device 80 may also include one or more input devices (e.g., keypads) or output devices (e.g., displays, speakers) coupled to processor 84. Contactless receiver 82 refers to any suitable device for receiving wireless signals. The signals are received by contactless receiver 82 by any suitable method (e.g., using NFC capability). In one example, contactless receiver 82 receives a wireless signal with a request for a notification from contactless transmitter 32 of portable consumer device 30. In another example, contactless receiver 82 receives a wireless signal with a notification message via a cellular network. Processor 84 (e.g., a microprocessor) processes the functions of notification device 80. CRM 86 comprises code for processing requests for notification messages, for receiving notification messages, and for providing notification messages to consumer 20. An example of code for providing notification messages to consumer 20 includes code for displaying notification messages to an output device.

A notification message refers to a communication provided to notification device 80. In some embodiments, the notification message is one-way such that the recipient cannot reply to the message. Notification messages can be in any suitable form and may be delivered by any suitable method. Some exemplary forms of notification messages include a short message service (SMS) message such as a text message, a phone call, a voice message, a voicemail message, an instant messaging (IM) message, an email message, and a periodically updated display on a device. An exemplary notification message is a text message delivered to a portable consumer device (e.g., a mobile phone). In some embodiments, notification messages are associated with transactions being conducted by holder 15 using portable consumer device 30.

Sending notification messages to notification device 80 is triggered by time-based triggers and/or event-based triggers. Time-based triggers refer to triggers which occur on a fixed interval. For example, a "Daily Available Balance" message can be triggered by a time-based trigger occurring at the end of the processing day so that the available balance reflects all transactions made that day. Event-based triggers refer to triggers that occur based on the completion of a specific event. Some examples of event-based triggers include completion of a transaction, authorization/approval of a transaction, declination of a transaction, transfer of funds into an account associated with portable consumer device 30, change of status of portable consumer device 30, reducing the balance on the account below a predefined threshold value, receiving a request for funds transfer from the account, receiving a request for authorization of a transaction involving an adult-oriented purchase, updating holder 15 or consumer 20 profiles associated with the account. Other examples of event-based triggers include actions such as interacting portable consumer device 30 with access device 42 or requesting a notification message.

Any suitable type of notification message can be sent to notification device 80. Some examples of types of notification messages include a "Daily Available Balance," "Approved Pending Transactions," "Declined Transactions," "Value Load," "Change of Card Status," "Low Balance," "Funds Transfer Requested," "Holder Profile Data Updated," "Consumer Profile Data Updated," or "Adult-Oriented Purchase." The "Daily Available Balance" message is a notification message including the daily balance in the account associated with portable consumer device 30. In some cases, the "Daily Available Balance" message may be delivered to notification device 80 at the same time each day. The "Approved Pending Transactions" message indicates that a pending transaction made using portable consumer device 30 has been approved. The "Declined Transactions" message indicates that a transaction initiated with portable consumer device 30 has been declined. The "Value Load" message indicates that funds have been loaded into the account associated with portable consumer device 30. For example, a "Value Load" message may include the amount of funds transferred to an account (e.g., a prepaid card account). The "Change of Card Status" message indicates a change in status of portable consumer device 30. Some examples of statuses include suspended, issued, active, expired, lost, stolen, and pending account closure. The "Low Balance" message indicates that the balance on the account associated with portable consumer device 30 has dropped below a predefined threshold value. The "Funds Transfer Requested" message indicates that a request has been made to transfer funds from the account of consumer 20 associated with portable consumer device 30. The "Holder Profile Data Updated" message indicates that the profile data associated with holder 15 of portable consumer device 30 has been updated. The "Consumer Profile Data Updated" message indicates that profile data associated with consumer 20 has been updated. The "Adult-Oriented Purchase" message indicates that a purchase of an adult-oriented nature has been conducted using portable consumer device 30.

Notification messages can include any suitable content such as information related to the account of consumer 20 associated with portable consumer device 30. Some examples of suitable content include account balances (e.g., prepaid card balances), transaction information, account status information, status of the portable consumer device 30, information regarding account activity such as a funds transfer request, consumer profile information, holder profile information, and other suitable information associated with the account of consumer 20. The content included in the notification messages can be either static or dynamic in nature. Static content refers to information that does not normally change with time such as the name of the consumer 20. Dynamic content refers to information that changes with time. In some case, dynamic content can reflect all transactions on a portable consumer device 30 made through the time the notification message is triggered.

Notification messages are associated with message data. Message data is any suitable data related to notification messages. Some examples of message data are the type of message, the type of trigger causing the notification message to be sent, the time the notification message was received, the consumer 20 associated with the notification device 80 receiving the notification message and the account of the associated consumer 20, a unique message identification number assigned to each notification message, a group message identification number, and other suitable data related to messages. In some cases, each consumer 20 in a group of consumers may receive a notification message having the same content. In these cases, the notification message sent to the group may also be assigned a group message identification number as well.

Fees can be associated with the privilege of receiving notification messages on notification device 80. Any suitable type of fee may be incurred. Some examples of fees include a notification fee and a periodic enrollment fee. The notification fee is a charge associated with each notification message generated and/or delivered to notification device 80. A periodic enrollment fee is a charge for being enrolled to receive notification messages. A periodic enrollment fee may be based on any suitable time period such as a day, a month, a year, a quarter, or other suitable amount of time. Fees can be charged by any suitable entity. Examples of suitable entities that charge fees for notification messages include aggregator 90, payment processing network 60, payment brand organization, enrollment and notification module 100, or other suitable entities that allow the notification messages to be generated and provided to notification device 80. Fees may be charged to any suitable entity. For example, aggregator 90 may charge enrollment and notification module 100 for collecting and delivering the notification message to notification device 80 and may charge consumer 20 for receiving notification messages. As another example, issuer 70 may charge consumer 20 for receiving notification messages.

Fee data refers to information related to fees. Some examples of fee data include the amount of the fee, the notification message(s) associated with the fee, the time the associated notification was delivered, the type of notification message(s) associated with the fee, information identifying the notification device receiving the notification message, the unique message identification number of the notification message(s) associated with the fee, information identifying the recipient of the notification message(s) associated with the fee, and other suitable information associated with the fee.

Enrollment and notification module 100 refers to one or more devices that allow consumers 20 to enroll to receive notification messages, that generate notification messages, that forward generated notification messages to aggregator 90, that generate fees associated with the notification messages, and that allow consumers 20, issuers 70, and/or payment brand organizations to manage notification messages and information related to notification messages such as fees associated with notification messages. In some embodiments, enrollment and notification module 100 may be part of payment processing network 60 or issuer 70.

Notification enrollment server 105 refers to any suitable device that receives enrollment information from consumer 20, enrolls consumer 20, and provides information related to notification messages to consumer 20. Enrollment information includes any suitable information related to enrolling the consumer/holder to receive notification messages. Some examples of enrollment information include triggers for sending notification messages, consumer profile information such as contact information, holder profile information, types of notification messages that the consumer/holder elects to receive, a notification message program that consumer has elected, and other suitable information related to enrolling consumer/holder to receive notification messages. Consumer 20 or issuer 70 can define the enrollment information when enrolling to receive notification messages. In some cases, holder 15 can also define enrollment information associated with the notification messages that holder 15 receives. In other embodiments, issuer 70 can provide enrollment information to notification enrollment server 105. For example, issuer 90 may enroll consumer 20 having an account with issuer 90 to receive notification messages.

Notification enrollment server 105 also tracks the number of holders 15 and the number of consumers 20 enrolled to receive notification messages on notification system 10 and stores these numbers on notification and fee database 130.

In the illustrated embodiment, notification enrollment server 105 is in communication with computer 190 for receiving information from consumer 20 and for providing information to consumer 20. In other embodiments, notification server 15 may be in communication with other computers 190 for receiving information from and providing information to other suitable entities such as issuer 70. For example, issuer 70 may enroll its consumer 20 in notification messages programs using a computer 190 communicating with notification enrollment server 105. As another example, issuer 70 may manage notification messages, message data, fees, and fee data associated with consumers 20 having accounts with issuer 70. In one case, issuer 70 may be able to add or change fee schedules for notification messages associated with a particular consumer 20. In another case, issuer 70 may be able to remove a particular fee charged for the delivery of a particular notification message. Computer 190 can be a desktop computer, a laptop computer, a cellular or mobile phone, a personal digital assistant (PDA), or other suitable device. In some embodiments, computer 190 and notification device 80 and/or portable consumer device 30 may be embodied in the same device.

Notification enrollment application server 110 refers to any suitable device for providing applications to notification enrollment server 105 and for forwarding information from notification enrollment server 105 to database server 120. Consumer 20 uses these applications on computer 190 to provide information such as enrollment information and to receive information such as notification messages. Notification enrollment application server 110 is in communication with notification enrollment server 105 to provide applications for use with computer 190.

Database server 120 refers to any suitable device capable of storing information to and retrieving information from notification and fee database 130. In the illustrated embodiment, database server 120 is in communication with notification and fee database 130 to retrieve and store information to notification and fee database 130.

Notification and fee database 130 refers to any suitable relational database capable of storing and allowing retrieval of information used by notification system 10. Some examples of information stored and retrieved from notification and fee database 130 include notification messages and associated message information, enrollment information, fees and associated fee data, account information, information about the and any other suitable information associated with notification messages.

Notification server 140 refers to any suitable device or devices that process notification messages and processes fees associated with the notification messages. When triggered, notification server 140 generates notification messages based on the enrollment information retrieved from notification and fee database 130. Notification server 140 determines fees that apply for the service of receiving notification messages. Notification server 140 determines fees that apply based on the enrollment data stored in notification and fee database 130. The fees are stored on notification and fee database 130.

Notification server 140 provides fee data including fees and associated data to suitable entities that charge fees for the notification messages being delivered. Some examples of such suitable entities that may charge fees for notification messages include issuers 70, payment processing network 60, aggregators 90, payment brand organizations, and other suitable entities involved in notification system 10. For example, notification server 140 may provide fee data and other data to issuer 70 so that issuer 70 can charge fees to consumer 20.

Notification server 140 and notification enrollment application server 12 are in communication with database server 120 to store information to and retrieve information from notification and fee database 130. Notification server 140 is also in communication with payment processing network 60 to communicate enrollment information, fee data, and other information related to notification messages to issuer 70.

Notification server 140 processes notification messages and sends the notification messages through gateway 150 to aggregator 90. Gateway 150 refers to any suitable device that converts information from the protocol or format used in enrollment and notification module 100 to those used in aggregator 90. Aggregator 90 refers to any suitable entity or device that receives notification messages, collects the notification messages, and transmits the notification messages to notification device 80. In some cases, aggregator 90 may be a wireless telephone company.

Although not shown in the illustrated embodiment, notification system 10 may also include a payment brand organization (e.g., credit card company) associated with portable consumer device 30. The payment brand organization refers to any suitable organization that provides one or more components of payment processing network 60. Payment brand organization may also provide one or more components of enrollment and notification module 100.

In a typical payment transaction, consumer 20 uses portable consumer device 30 at access device 42 to purchase goods or services from merchant 40. For example, a consumer may use a gift card worth $500 to buy a $50 game cartridge at a toy store using a POS (point of sale) terminal at the toy store. The consumer may swipe the gift card through a slot in the POS terminal and the POS terminal may read data including an account number from the gift card.

An authorization request message is then forwarded to acquirer 50 and acquirer 50 forwards the message through payment processing network 60 to issuer 70. Issuer 70 determines whether or not to authorize the transaction. The transaction may be authorized if there are sufficient funds, and may be declined if there are insufficient funds. An authorization response message is then sent back through payment processing network 60 to acquirer 50 who forwards it to merchant 40. At the end of the day, a normal clearing and settlement process can be conducted by payment processing network 60. A clearing process is a process of exchanging financial details between and acquirer and an issuer to facilitate posting to a consumer's account and reconciliation of the consumer's settlement position.

Notification server 140 receives a notification message trigger. For example, notification sever 140 may receive a trigger that a $50 transaction was made when consumer used portable consumer device 30 at access device 42. In response, notification server 140 retrieves enrollment information having trigger information from notification and fee database 130. Notification server 140 confirms that consumer 20 is enrolled to receive the notification message based on the trigger information. In this example, the trigger information indicates that consumer 20 is enrolled to receive a notification message when portable consumer device 30 is used in a purchase of $50 or above. Notification server 140 uses the trigger information to confirm that consumer 20 wanted to trigger a notification message when their portable consumer device 30 was used in the $50 transaction. The enrollment information also indicates that consumer 20 wants to receive the notification message in the form of a text message.

Once enrollment is verified, notification server 140 generates the notification message and assigns it a message identification number. Notification server 140 sends the notification message through gateway 150 to aggregator 90. Aggregator 90 collects and distributes the notification message to notification device 80. Notification device 80 displays or otherwise provides the notification message to consumer 20. For example, the consumer's portable consumer device 30 may display "Your prepaid card has had been used in a $50 purchase, your balance is $450." Consumer 20 may thereafter store this information in the notification device 80 for future use in determining how much money is left on the portable consumer device 30.

Each time a notification message is successfully delivered, notification server 140 generates a message fee. Notification server 140 identifies the consumer 20 associated with notification device 80 receiving the notification message and associates the message fee with the account belonging to consumer 20. Notification server 150 also associates other fee information to the account of consumer 20 such as the time the notification message was delivered, the amount of the message fee, and the type of notification message. Notification server 140 stores the message fee and fee information on notification and fee database 130. Notification server 140 delivers the fee and fee information an entity (e.g., an issuer) that charges the message fee to the consumer in the form of a monthly billing statement. The billing statement may also include a monthly enrollment fee for maintaining enrollment in the notification message program.

Examples of other notification systems can be found in U.S. patent application Ser. No. 11/963736 filed on Dec. 21, 2007 entitled real-time balance updates and U.S. patent application Ser. No. 11/962836 filed on Dec. 21, 2007 entitled Customized Payment Transaction Notification. These references are herein incorporated by reference in its entirety for all purposes.

Modifications, additions, or omissions may be made to notification system 10 without departing from the scope of the disclosure. The components of notification system 10 may be integrated or separated according to particular needs. Moreover, the operations of notification system 10 may be performed by more, fewer, or other system modules. Additionally, operations of notification system 10 may be performed using any suitable logic comprising software, hardware, other logic, or any suitable combination of the preceding.

2. Exemplary Portable Consumer Devices

Figure 2:
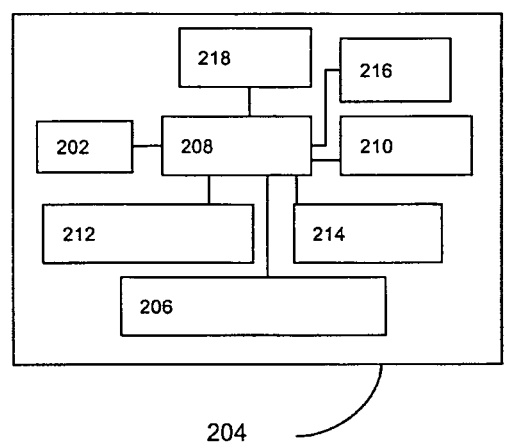
FIG. 2 is a block diagram illustrating a portable consumer device, in accordance with an embodiment of the invention.

FIG. 2 is a block diagram illustrating a portable consumer device 30, in accordance with an embodiment of the invention. Although FIG. 2 shows a number of components, portable consumer device 30 of this invention may comprise any suitable combination or subset of such components.

In the illustrated example, portable consumer device 30 comprises a computer readable medium (CRM) 202 and a body 204. The computer readable medium 202 may be present within the body 204, or may be detachable from it. The body 204 may be in the form a plastic substrate, housing, or other structure. The computer readable medium 202 may be a memory that stores data and may be in any suitable form including a magnetic stripe, a memory chip, uniquely derived keys, encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 30.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

In some embodiment, the computer readable medium, or memory, may further comprise a) code for providing an alias identifier associated with an account identifier associated with an account of a presenter; b) code for receiving an authentication request message after providing the alias identifier; and c) code for sending an authentication response message after receiving the authentication request message.

Portable consumer device 30 may further include a contactless element 206, which may include a semiconductor chip (or other data storage element) with an associated wireless transfer (e.g., data transmission) element, such as an antenna. Contactless element 206 is associated with (e.g., embedded within) portable consumer device 30 and data or control instructions transmitted via a cellular network may be applied to contactless element 206 by means of a contactless element interface (not shown). The contactless element interface functions to permit the exchange of data and/or control instructions between the mobile device circuitry (and hence the cellular network) and an optional contactless element 206.

Contactless element 206 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between portable consumer device 30 and an interrogation device. Thus, portable consumer device 30 is capable of communicating and transferring data and/or control instructions via both cellular network and near field communications capability.

Portable consumer device 30 may also include a processor 208 (e.g., a microprocessor) for processing the functions of portable consumer device 30 and a display 210 to allow a consumer to see phone numbers and other information and messages. Portable consumer device 30 may further include input elements 212 to allow a consumer (or presenter) to input information into the device, a speaker 214 to allow the consumer to hear voice communication, music, etc., and a microphone 216 to allow the consumer to transmit her voice through portable consumer device 30. Portable consumer device 30 may also include an antenna 218 for wireless data transfer (e.g., data transmission).

Figure 3:
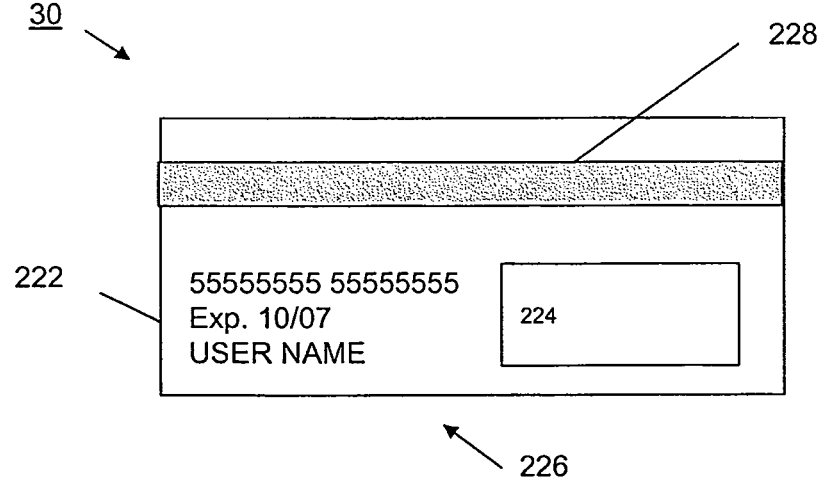
FIG. 3 is a block diagram illustrating a portable consumer device in the form of a card, in accordance with an embodiment of the invention.

FIG. 3 is a block diagram of a portable consumer device 30 in the form of a card 220, in accordance with an embodiment of the invention. Card 220 comprises a plastic substrate 222. A contactless element 224 for interfacing with an access device such as a point of sale terminal may be present on or embedded within plastic substrate 222. Consumer information 226 such as an account number, expiration date, and consumer name may be printed or embossed on card 222. A magnetic stripe 228 may also be on plastic substrate 222.

As shown in the illustrated embodiment, card 220 may include both a magnetic stripe 228 and a contactless element 224. In other embodiments, both magnetic stripe 228 and contactless element 224 may be in the card 220. In these embodiments, the portable consumer device can operate in either a contact or contactless mode. In other embodiments, either magnetic stripe 228 or contactless element 224 may be present in card 220.

Modifications, additions, or omissions may be made to either of the exemplary portable consumer devices shown in FIGS. 2 and 3 without departing from the scope of the disclosure. The components of these exemplary portable consumer devices can be separated according to particular needs. Moreover, the operations of the exemplary portable consumer devices may be performed by more, fewer, or other components. Additionally, operations of theses exemplary portable consumer devices may be performed using any suitable logic comprising software, hardware, other logic, or any suitable combination of the preceding.

3. Exemplary Notification Device

Figure 4:
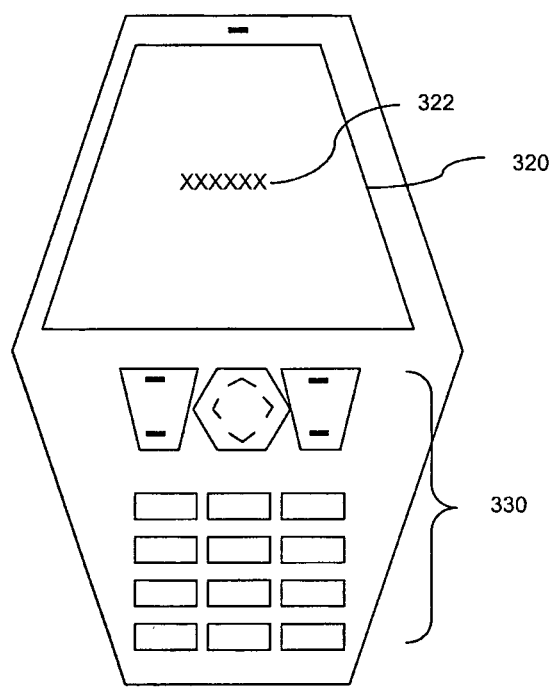
FIG. 4 is a schematic drawing of an exemplary notification device in the form of a cell phone for displaying information such as a notification message, in accordance with an embodiment of the invention.

FIG. 4 is a schematic drawing of an exemplary notification device 20 in the form of a cell phone 300 for displaying information 322 such as a notification message, in accordance with an embodiment of the invention. Cell phone 300 comprises a display 320 for displaying information 322, buttons 330 for inputting information such as requests for notification messages, a speaker (not shown) to send aural signals to consumer 20, and a microphone (not shown) to receive aural signals from consumer 20.

Display 320 can display any suitable information 322 such as a notification message. For example, display 320 may display a "Funds Transfer Requested" notification message when holder 15 of portable consumer device 30 attempts to transfer from the account of consumer 20 using the portable consumer device 30. If consumer 20 is enrolled to receive notification messages in the form of text messages, notification message 272 may be a text message stating "Your Account 55555555 55555555 had a transfer request of $1000. Your card balance is $10. Please do not respond to this message."

Modifications, additions, or omissions may be made to cell phone 300 without departing from the scope of the disclosure. For example, the components of cell phone 300 may be integrated or separated according to particular needs. Moreover, the operations of cell phone 300 may be performed by more, fewer, or other modules. Additionally, operations of cell phone 300 may be performed using any suitable logic comprising software, hardware, other logic, or any suitable combination of the preceding.

4. Exemplary Method of Providing Notification Messages

Figure 5:
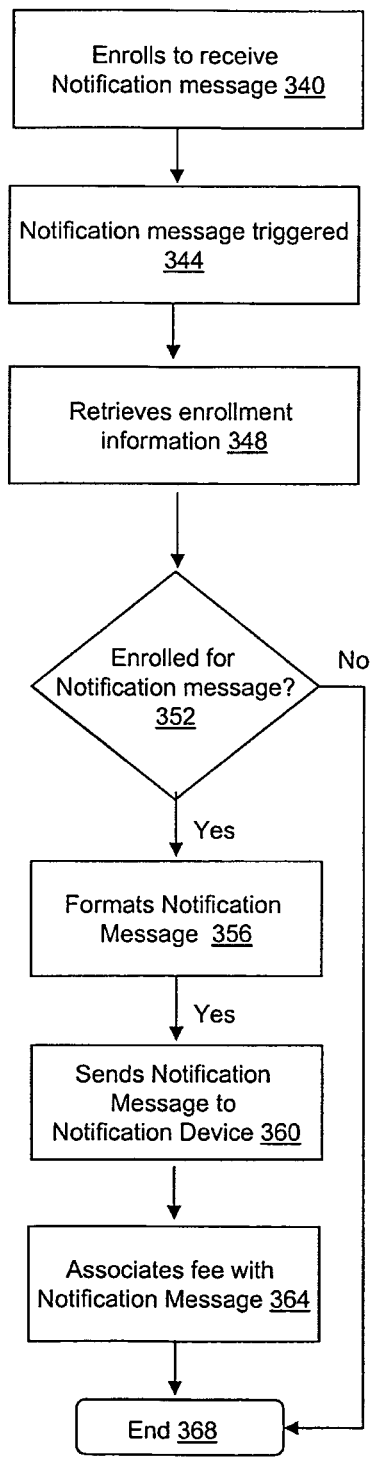
FIG. 5 is a flow chart illustrating a method of providing notification messages, in accordance with an embodiment of the invention.

FIG. 5 is a flow chart illustrating a method of providing notification messages, in accordance with an embodiment of the invention.

Consumer 20 enrolls in a program using computer 190 to receive notification messages on their portable consumer device 30 (step 340). Consumer 20 enters enrollment information on computer 190 to enroll in the notification message program. Computer 190 sends the enrollment information to notification enrollment server 105 which forwards the information to notification enrollment application server 110. Notification enrollment application server 110 forwards the enrollment information to database server 120 to store it in notification and fee database 130.

In some embodiments, consumer 20 is a parent enrolling themselves in a program to receive alerts regarding inappropriate transactions conducted using portable consumer device 30 (e.g., a prepaid card given to their teen child). In one example, parent may enroll to receive a notification message when the portable consumer device 30 is used for purchases over $500 or when the portable consumer device 30 is used for an "adult-oriented purchase." In a specific example, a parent gives her two teenage sons reloadable prepaid cards. The parent elects to enroll to receive a text message every time the oldest son's account falls below $100. After the oldest son purchases text books for the Fall semester, the parent receives the text message "Your prepaid card ending in 9307 has received a load of $2,123.69. Your card balance is $2,688.36. Do not respond to this message."

In another embodiment, holder 15 can be enrolled to receive notification messages on their own notification device 80. Consumer 20 can enroll holder 15 or holder 15 can enroll himself. In some cases, holder 15 may not have the same enrollment options as consumer 20 has. In the embodiment described above, the child may be able to enroll to receive notification messages. The parent may enroll the child to receive notification messages on the child's notification device or the parent may allow the child to enroll in the program. The parent may not want the child to be able to receive all types of notification messages that are available to the parent. For example, the parent may not want the child to receive a notification message if portable consumer device 30 is used to conduct an "adult-oriented purchase." In this example, the teen child will not have the option of enrolling to receive the "Adult-Oriented Purchase" notification message.

A notification message trigger occurs (step 344). Notification server 140 detects that the notification message has been triggered. The triggers can be event-based or time-based. In the case of event-based triggers, consumer 20, holder 15, or other suitable entity may trigger the notification message. For example, holder 15 may use portable consumer device 30 to transfer funds from the account of consumer 20. When the request for transfer has been submitted, a trigger has occurred and the trigger is sent to notification server 140. In the case of time-based triggers, the notification message may be triggered automatically on a periodic basis by notification server 140. Typically, the notification message is triggered at the end of the time period although any time during that time period can be used. Consumer 20 selects the time period such as daily, hourly, or weekly. For example, consumer 20 can select daily notification messages sent at 12:00 a.m.

Notification server 140 retrieves enrollment information (step 348) retrieved from notification and fee database 130 using database server 120. The enrollment information is related to an account of consumer 20 associated with portable consumer device 30.

Notification server 140 analyzes trigger information in the enrollment information to determine whether consumer 20 is enrolled to receive the notification that has been triggered (step 352). If consumer 20 is not enrolled to receive the notification message triggered, the method ends (step 368) and a notification message is not sent to consumer 20.

If consumer 20 is enrolled to receive the notification message triggered, notification server 140 generates and formats the notification message (step 356). In some cases, notification server 140 may generate the notification message with content that includes the transaction information. For example, the notification message may include the transaction amount.

Notification server 140 sends the notification message to aggregator 90 through gateway 150. Aggregator 90 forwards the notification message to notification device 160 (step 360). Notification device 80 provides the notification message to consumer 20 on notification device 80. In one embodiment, the notification message may be shown to consumer 20 on a display (e.g., a screen) on notification device 80. For example, the notification message may be a text message displayed on the notification device 80 until consumer 20 turns off the display or notification device 80. In another example, the notification message may be displayed for a predetermined period of time.

Notification server 140 determines a message fee for delivering the notification message using any suitable method. In some cases, the message fee could be determined using a fee schedule associated with the enrollment program. In these cases, notification server 140 looks up the fee on the fee schedule associated with the notification message.

Notification server 140 associates the message fee for delivering the notification message to the account of consumer 20 associated with the portable consumer device 20 (step 360). Notification server 140 provides the message fee information and other information related to the notification message to entities that use this information to charge consumer 30 for receiving the notification message. After sending the message fee, the method ends (step 270).

In one embodiment, notification server 140 tracks the message notification traffic in notification system 10. Some of the information that may be tracked includes the number of consumers 20 and holders 15 enrolled to receive notification messages on notification system 10 during a time period (e.g., a month), the number of notification messages delivered to consumers 20 enrolled in a specific notification message program during a time period, the total number of notification messages delivered to consumers 20 in notification system 10 during a time period, the fees (e.g., message fee and enrollment fee) charged to consumers 20 having an account with issuer 70, the number of notification messages of a particular type delivered during a time period, and other suitable notification message traffic values. These values may be stored to and retrieved from notification and fee database 130.

Notification server 140 can generate reports that include the notification message traffic values and other suitable data related to notification messages such as fee data, message data, and consumer account data. The generated reports may be sent to any suitable entity. Some suitable entities include issuers 70, a payment brand organization, acquirers 50, aggregators 90, payment processing network 60, or other suitable entity. In one example, a suitable entity may be an issuer 70 requested the report from notification server 140. The reports may be generated and provided to suitable entities on a periodic basis such as daily, monthly, quarterly, or yearly. For example, notification server 140 can generate a monthly report of the notification messages delivered to consumers 20 having accounts with a particular issuer 70 so that issuer 70 can charge fees for the notification messages delivered to their consumers 20. In some cases, issuer 70 can use the information in the reports to generate a monthly bill to their consumers 20.

The reports generated by notification server 140 can be in any suitable format and include any suitable content. In one example, reports may itemize notification messages delivered and the associated fees charged to the consumer 20 based on the notification message program that they are enrolled in. An example of suitable content may include information retrieved from notification and fee database 130 such as fee data.

Modifications, additions, or omissions may be made to the method without departing from the scope of the disclosure. The method may include more, fewer, or other steps. Additionally, steps may be performed in any suitable order without departing from the scope of the disclosure.

Modifications, additions, or omissions may be made to interface 400 without departing from the scope of the disclosure. The sections of interface 400 may be integrated or separated according to particular needs. Moreover, the operations of each section of interface 400 may be performed by more, fewer, or other sections.

5. Managing Notification Messages

Figure 6:
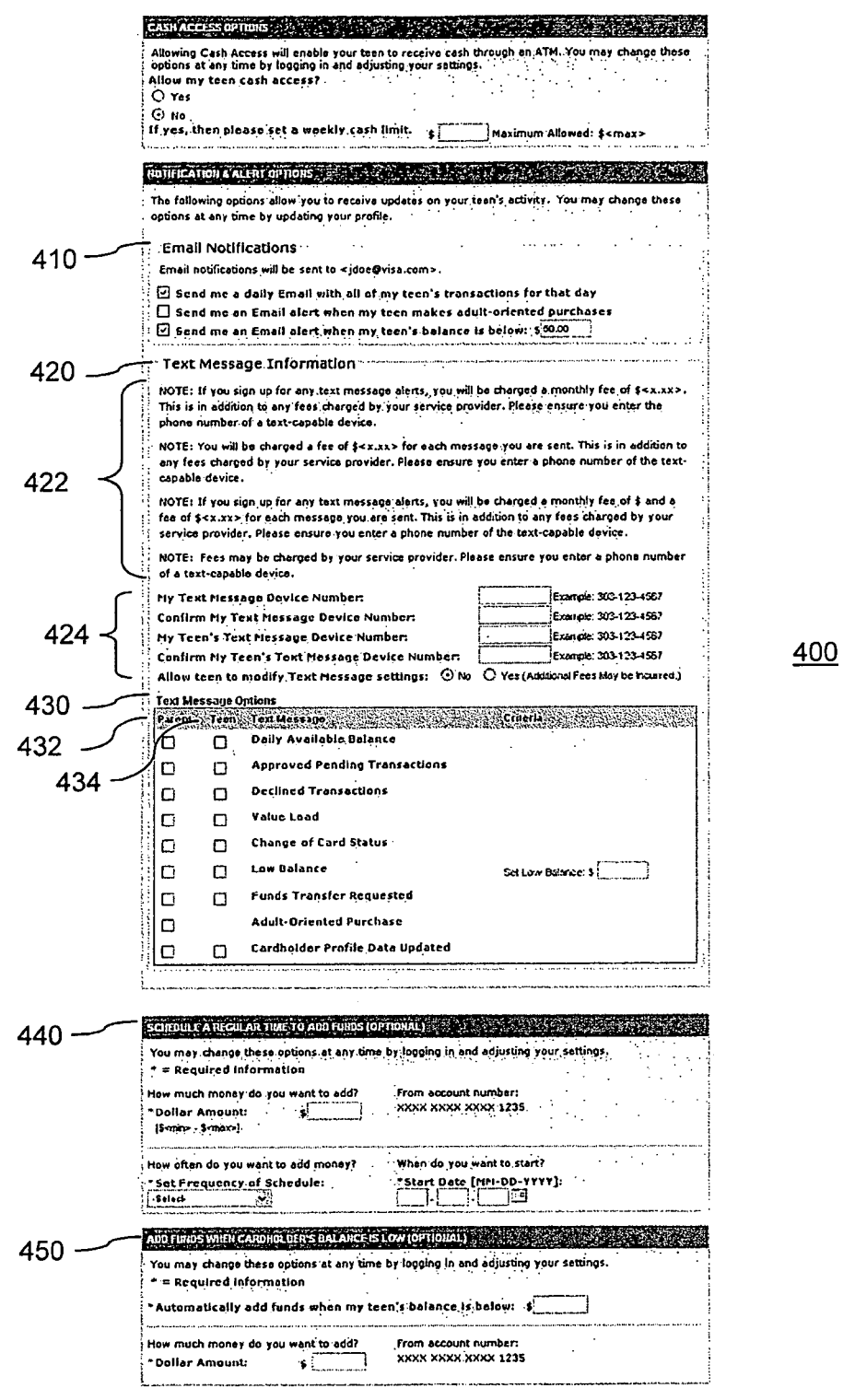

FIG. 6 is a screenshot illustrating an interface 400 that allows a parent to manage notification message options for a parent and a teen, in accordance with an embodiment of the invention. The notification message options can be associated with a particular notification message program. In the illustrated example, parent is a consumer 20 that has given a prepaid card to their teen who is a holder 15. The interface 400 allows the parent to manage notification message options for themselves and for their teen. Using interface 400, the parent can manage notification message options by cancelling previously elected options, modifying previously elected options, and/or electing new options.

In section 410 of the interface 400, the parent can elect email notification messages. The parent can elect to receive email notification of daily transactions on the card, to receive an email alert when the teen makes an "adult-oriented purchase," and/or an email alert when the balance on the card falls below a predetermine amount.

In section 420 of the interface 400, the parent signs up for text messages. Section 420 includes notes 422 that notify the parent that they will be charged a monthly enrollment fee and a message fee for every message sent in addition to any fees charged by the service provider (e.g., phone company). In section 424, parent enters the numbers (e.g., phone numbers) associated with the notification device or notification devices that will receive notification messages. In this example, the teen can receive notification messages on a notification device 80 and the parent can receive notification message on another notification device 80. Also in this section 424, parent can elect to allow teen to modify their own text message settings.

Section 430 of the interface 400 includes the text message options available to be elected by the parent. Section 430 includes boxes 432 where parent can select the types of text messages that they want to receive on their own notification device 80. Section 430 also includes boxes 434 where parent can select the types of text messages that they want their teen to receive on the teen's notification device 80. The types of text message options available to the parent are: Daily Available balance, Approved Pending Transactions, Declined Transactions, Value Load, Change of Card Status, Low Balance, Funds Transfer Requested, Adult-Oriented Purchase, Cardholder Profile Data Updated. In the illustrated example, the teen does not have the option of receiving a notification message regarding an Adult-Oriented Purchase.

Modifications, additions, or omissions may be made to interface 400 without departing from the scope of the disclosure. The sections of interface 400 may be integrated or separated according to particular needs.

FIG. 7 is a screenshot illustrating a summary 500 of the notification message options elected by parent, in accordance with an embodiment of the invention. The interface 400 shown in FIG. 6 may have been used to elect the notification message options summarized in FIG. 7. In the illustrated example, parent is a consumer 20 that has given a prepaid card to their teen who is a holder 15.

Summary 500 includes a teen profile 510 which lists profile information associated with the teen, a shipping method for delivery of the prepaid card, an initial value of the prepaid card, information regarding cash access, notification and alert options 530, scheduled funding, and information regarding funds added to the prepaid card when the balance is low. Notification and alert options 530 summarizes the elected email notifications 532, text message information 534, and text message options 540. Text message options 540 includes the options 542 elected for the parent and the options 544 elected for the teen.

Modifications, additions, or omissions may be made to summary 500 without departing from the scope of the disclosure. The sections of summary 500 may be integrated or separated according to particular needs.

FIG. 8 is a screenshot illustrating an interface 600 and that allows a user to manage notification message options, in accordance with an embodiment of the invention. In the interface 600, user can manage notification message options for parent and teen. User can be any suitable entity. For example, user can be the issuer 70 operating an account for parent. Issuer 70 may enroll the parent and the teen in a notification message program. Using interface 600, the user can manage notification message options by cancelling previously elected options, modifying previously elected options, and/or electing new options. In the illustrated example, parent is a consumer 20 that has given a prepaid card to their teen who is a holder 15.

Interface 600 has sections including account holder information 610, cardholder information 620, text message information 630, and text message options 640. Account holder information 610 indicates that parent is an account holder named Jane Wallace. Cardholder information 620 indicates that teen is a cardholder named Bobby Wallace.

In section 630, the user enters the numbers (e.g., phone numbers) associated with the notification device or notification devices that will receive notification messages. In entry 632, the user can enter the numbers of the notification device 80 where the parent will receive their notification messages. In entry 634, the user can enter numbers of the notification device 80 where teen will receive their notification messages. User can also elect to allow the teen to modify their own text message settings.

Section 640 of the interface 600 includes the text message options that can be elected by the user. Section 640 includes boxes 650 where user can select the types of text messages that the parent will receive. Section 640 also includes boxes 660 where user can select the types of text messages that the teen will receive. The types of text message options available to the user are: Daily Available balance, Approved Pending Transactions, Declined Transactions, Value Load, Change of Card Status, Low Balance, Funds Transfer Requested, Adult-Oriented Purchase, Cardholder Profile Data Updated. In the illustrated example, the user does not have the option of allowing the teen to receive a notification message regarding an Adult-Oriented Purchase.

Modifications, additions, or omissions may be made to interface 600 without departing from the scope of the disclosure. The sections of interface 600 may be integrated or separated according to particular needs.

Figure 9:
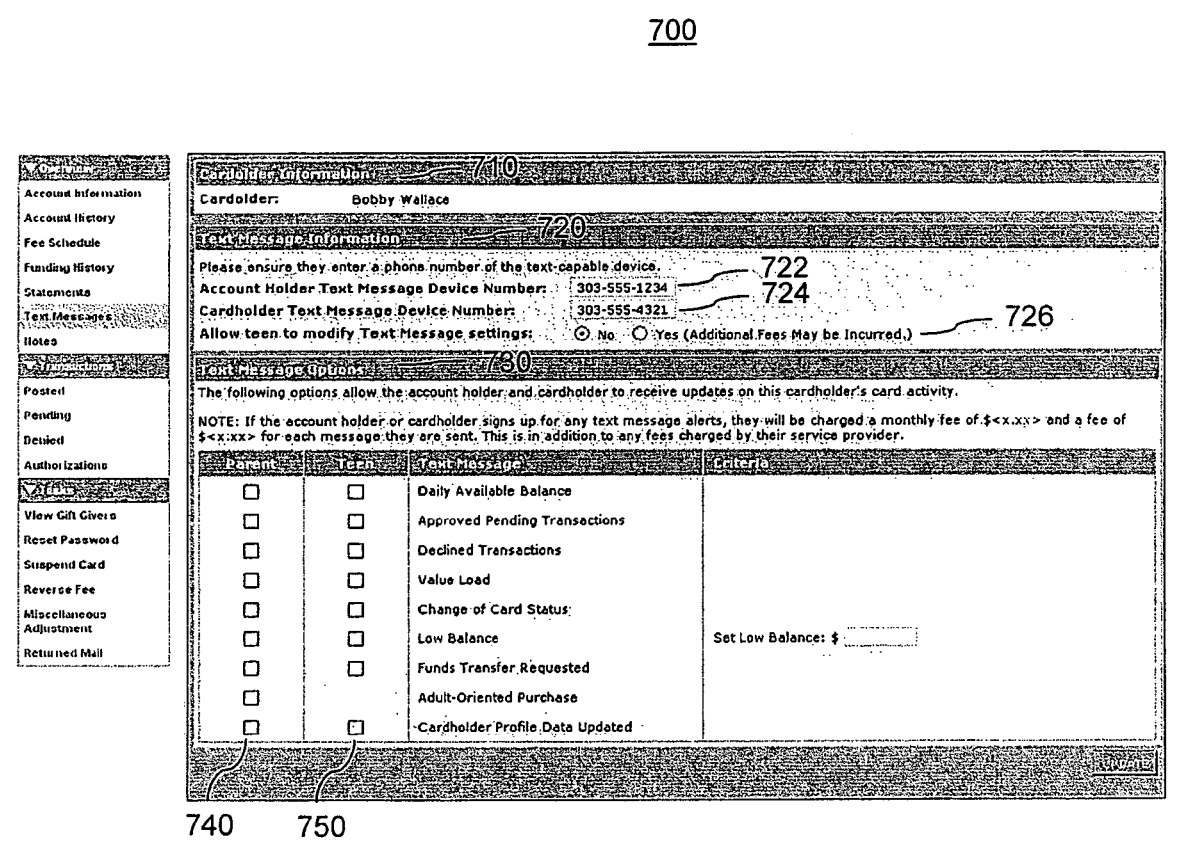

FIG. 9 is a screenshot illustrating an interface 700 that allows a user to manage notification message options, in accordance with an embodiment of the invention. In the interface 700, user can manage notification message options for parent and teen. Using interface 700, the user can manage notification message options by cancelling previously elected options, modifying previously elected options, and/or electing new options. In the illustrated example, parent is a consumer 20 that has given a prepaid card to their teen who is a holder 15.

Interface 700 has sections including cardholder information 710, text message information 720, and text message options 730. Cardholder information 710 indicates that teen is a cardholder named Bobby Wallace.

In section 720, the user enters the numbers (e.g., phone numbers) associated with the notification device or notification devices that will receive notification messages. In entry 722, the user can enter the number of the notification device 80 where the parent will receive their notification messages. In entry 724, the user can enter number of the notification device 80 where teen will receive their notification messages. User can also elect to allow the teen to modify their own text message settings.

Section 730 of the interface 700 includes the text message options that can be elected by the user. Section 730 includes boxes 740 where user can select the types of text messages that the parent will receive. Section 730 also includes boxes 750 where user can select the types of text messages that the teen will receive. The types of text message options available to the user are: Daily Available balance, Approved Pending Transactions, Declined Transactions, Value Load, Change of Card Status, Low Balance, Funds Transfer Requested, Adult-Oriented Purchase, Cardholder Profile Data Updated. In the illustrated example, the user does not have the option of allowing the teen to receive a notification message regarding an Adult-Oriented Purchase.

Modifications, additions, or omissions may be made to interface 700 without departing from the scope of the disclosure. The sections of interface 700 may be integrated or separated according to particular needs.

FIG. 10 is a screenshot illustrating an interface 800 that allows a consumer 20 to manage their text message options, in accordance with an embodiment of the invention. The notification message options can be associated with a particular text message program. Using interface will 400, consumer 20 can manage text message options by cancelling previously elected options, modifying previously elected options, and/or electing new options.

interface 800 includes text message information section 810 and text message options section 820. Section 810 includes notes 812 that notify consumer 20 that they will be charged a monthly enrollment fee and a message fee for every message sent in addition to any fees charged by the service provider (e.g., phone company). In section 818, consumer 20 enters and confirms the number (e.g., phone number) associated with the notification device where they will receive notification messages.

Section 820 of the interface 800 includes the text message options available to be elected by consumer 20. Section 820 includes boxes where consumer 20 can select the types of text messages that they want to receive on their own notification device 80. The types of text message options available to the parent are: Daily Available balance, Approved Pending Transactions, Declined Transactions, Value Load, Change of Card Status, Low Balance, Funds Transfer Requested, Adult-Oriented Purchase, Cardholder Profile Data Updated.

Modifications, additions, or omissions may be made to interface 800 without departing from the scope of the disclosure. The sections of interface 800 may be integrated or separated according to particular needs.

Figure 11:
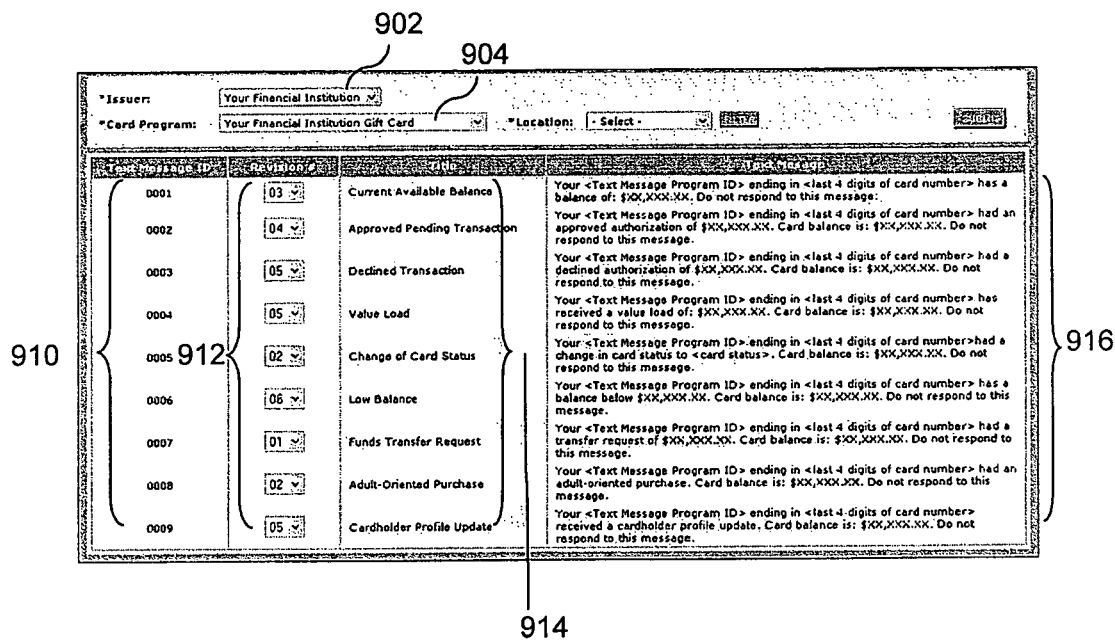
FIG. 11 is a screenshot of a text message library for a given notification message program, in accordance with an embodiment of the invention.

FIG. 11 is a screenshot of a text message library 900 for a given notification message program, in accordance with an embodiment of the invention. The text message library 900 allows a user to show the types of text messages that can be sent within a particular card program available to an issuer 70. At entry 902, the user can select the issuer. At entry 904, the user can select the card program. The user can be any suitable user such as an issuer.

The text message library 900 also lists the text message IDs 910, the revision numbers 912, the titles of the text messages 914, and the text messages 916.

Modifications, additions, or omissions may be made to text message library 900 without departing from the scope of the disclosure. The sections of text message library 900 may be integrated or separated according to particular needs.

FIG. 12 is a screenshot of a report 920, in accordance with an embodiment of the invention. Reports 920 includes report data 922, the total numbers of enrolled entities 924, and a table 926 indicating the total number of delivered text messages of each type that have been delivered in notification system 10. Report data 922 includes the client requesting the report, the notification message program, the location, the run date of the report, and page number. The run date of the report indicates the date that the report was generated. The total numbers of enrolled entities 924 includes the total number of consumers 20 that are enrolled to receive text messages. The total numbers of enrolled entities 924 also includes the total number of holders 15 that are enrolled to receive text messages.

Table 926 includes a column listing the message types available in the notification message program. The message types include current balance, approved authorizations, declined authorizations, value load, change of card status, balance below threshold, funds transfer request, adult-oriented purchase, cardholder profile updated, and fraud block. Table 926 indicates the number of each type of text message sent during the time period of the report 920. Table 926 also indicates the number of subscribed accounts associated with each message type.

Modifications, additions, or omissions may be made to report 920 without departing from the scope of the disclosure. The sections of report 920 may be integrated or separated according to particular needs.

6. Computer Apparatuses

Figure 13:
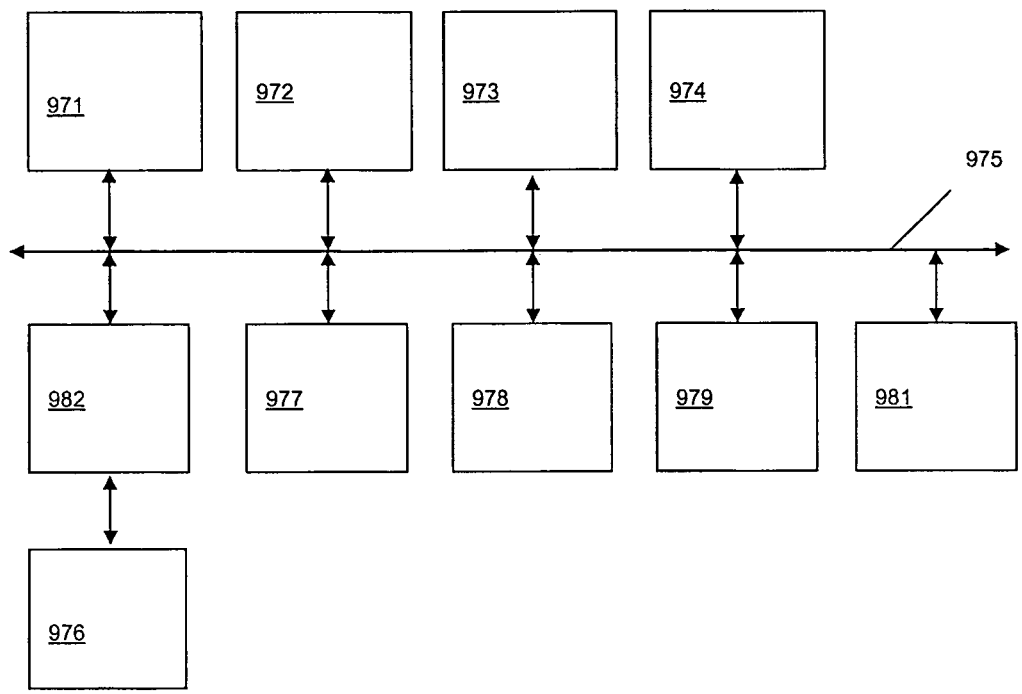
FIG. 13 shows a block diagram of subsystems that may be present in computer apparatuses that are used in the notification system, according to embodiments of the invention.

FIG. 13 shows a block diagram of subsystems that may be present in computer apparatuses that are used in notification system 10, according to embodiments of the invention.

The various participants and elements in the previously described Figures may operate using one or more computer apparatuses to facilitate the functions described herein. Any of the elements in the Figures may use any suitable number of subsystems to facilitate the functions described herein. Examples of such subsystems or components are shown in a FIG. 13. The subsystems shown in FIG. 13 are interconnected via a system bus 975. Additional subsystems such as a printer 974, keyboard 978, fixed disk 979 (or other memory comprising computer readable media), monitor 976, which is coupled to display adapter 982, and others are shown. Peripherals and input/output (I/O) devices, which couple to I/O controller 971, can be connected to the computer system by any number of means known in the art, such as serial port 977. For example, serial port 977 or external interface 981 can be used to connect the computer apparatus to a wide area network such as the Internet, a mouse input device, or a scanner. The interconnection via system bus allows the central processor 973 to communicate with each subsystem and to control the execution of instructions from system memory 972 or the fixed disk 979, as well as the exchange of information between subsystems. The system memory 972 and/or the fixed disk 979 may embody a computer readable medium. Any of these elements may be present in the previously described features. For example, the previously described directory server and access control server may have one or more of these components shown in FIG. 13.

A computer readable medium according to an embodiment of the invention may comprise code for performing any of the functions described above. For example, the previously described directory server may comprise a computer readable medium comprising: a) code for providing an alias identifier associated with an account identifier associated with an account of a presenter; b) code for receiving an authentication request message after providing the alias identifier; and c) code for sending an authentication response message after receiving the authentication request message. The directory server may also have a processor coupled to the computer readable medium, where the processor executes instructions embodied by computer code on the computer readable medium.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. None is admitted to be prior art.

What is claimed is:

1. A method, comprising:
   retrieving enrollment information;
   confirming, based on the enrollment information, that a consumer is enrolled to receive a notification message and that a fee is to be associated for sending the notification message;
   sending the notification message to a notification device, the notification message associated with a portable consumer device issued by an issuer and associated with an account of the consumer operated by the issuer;
   associating the fee for sending the notification message;
   charging the fee to the account of the consumer, wherein the fee is to be obtained by the issuer or a payment brand organization associated with the portable consumer device, and wherein the issuer can change the fee associated with the notification message; and
   sending a report to the issuer, the report being different from the notification message,
   wherein the notification message is one of a plurality of notification messages sent to the notification device, and
   wherein the report includes an itemized list, the itemized list including an indicator of the plurality of notification messages, at least one message type associated with the plurality of notification messages, and fees for sending the plurality of notification messages.

2. The method of claim 1, further comprising triggering the notification message.

3. The method of claim 1, wherein the notification message is a text message.

4. The method of claim 1, wherein the notification message indicates that a funds transfer request was made.

5. The method of claim 1, wherein the portable consumer device is the notification device.

6. The method of claim 1, wherein the consumer is a holder of the portable consumer device.

7. The method of claim 1, wherein the consumer is a parent and a holder of the portable consumer device is a child of the parent.

8. The method of claim 1, wherein the notification message is triggered by a transaction conducted by a holder of the portable consumer device.

9. The method of claim 1, wherein the issuer can remove the fee associated with the notification message.

10. The method of claim 1, wherein sending the notification message to the notification device further comprises sending the notification message to an aggregator configured to send the notification message to the notification device.

11. The method of claim 1, wherein the notification message is triggered by a time-based trigger.

12. The method of claim 11, wherein the notification message indicates an available balance associated with the account.

13. The method of claim 1, wherein the notification message is triggered by an event-based trigger.

14. The method of claim 13, wherein the notification message indicates that the enrollment information has been updated.

15. The method of claim 1, wherein the portable consumer device is a gift card.

16. The method of claim 1 further comprising associating the notification message with message data.

17. The method of claim 16, wherein the message data comprises a type of the notification message, a type of trigger that causes the notification message to be sent, a time the notification was sent, and a unique message identification number.

18. The method of claim 1, wherein the notification device is one of a plurality of notification devices, and wherein the notification message is one of a plurality of notification messages sent to the plurality of notification devices.

19. The method of claim 1, wherein the at least one message type includes a current balance, approved authorizations, declined transactions, value load, change of card status, balance below threshold, funds transfer request, adult-oriented purchase, cardholder profile updated, or fraud block.

20. A system comprising:
    a database for storing fees; and
    a notification server coupled to the database, the notification server configured to:
    retrieve enrollment information;
    confirm, based on the enrollment information, that a consumer is enrolled to receive a notification message and that a fee is to be associated for sending the notification message;
    send the notification message to a notification device, the notification message associated with a portable consumer device issued by an issuer and associated with an account of the consumer operated by the issuer;
    associate the fee for sending the notification message;
    charge the fee to the account of the consumer, wherein the fee is to be obtained by the issuer or a payment brand organization associated with the portable consumer device, and wherein the issuer can change the fee associated with the notification message;and
    send a report to the issuer, the report being different from the notification message,
    wherein the notification message is one of a plurality of notification messages sent to the notification device, and
    wherein the report includes an itemized list, the itemized list including an indicator of the plurality of notification messages, at least one message type associated with the plurality of notification messages, and fees for sending the plurality of notification messages.

21. The system of claim 20, wherein the issuer can remove the fee associated with the notification message.

22. The system of claim 20, wherein the notification server is part of a payment processing network that delivers clearing and settlement services.

23. A non-transitory computer readable medium, comprising:
    code for retrieving enrollment information;
    code for confirming, based on the enrollment information, that a consumer is enrolled to receive a notification message and that a fee is to be associated for sending the notification message;
    code for sending the notification message to a notification device, the notification message associated with a portable consumer device issued by an issuer and associated with an account of the consumer operated by the issuer;
    code for associating the fee for sending the notification message;
    code for charging the fee to the account of the consumer, wherein the fee is to be obtained by the issuer or a payment brand organization associated with the portable consumer device, and wherein the issuer can change the fee associated with the notification message
    code for sending a report to the issuer, the report being different from the notification message,
    wherein the notification message is one of a plurality of notification messages sent to the notification device, and wherein the report includes an itemized list, the itemized list including an indicator of the plurality of notification messages, at least one message type associated with the plurality of notification messages, and fees for sending the plurality of notification messages.

24. The non-transitory computer readable medium of claim 23, further comprising code for triggering the notification message.

25. The non-transitory computer readable medium of claim 23, further comprising:
   code for triggering the notification message.

26. The non-transitory computer readable medium of claim 23, wherein the issuer can remove the fee associated with the notification message.

27. The non-transitory computer readable medium of claim 23, wherein the code for sending the notification message to the notification device further comprises code for sending the notification message to an aggregator configured to send the notification message to the notification device.

* * * * *